United States Patent
Hui et al.

(10) Patent No.: US 7,724,666 B1
(45) Date of Patent: *May 25, 2010

(54) CREDIT-BASED FLOW CONTROL OVER UNRELIABLE LINKS

(75) Inventors: Lawrence Hui, Sunnyvale, CA (US);
Song Zhang, San Jose, CA (US);
Anurag P. Gupta, Saratoga, CA (US);
Phil Lacroute, Sunnyvale, CA (US);
Michael Beesley, Hillsborough, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 929 days.

This patent is subject to a terminal disclaimer.

(21) Appl. No.: 11/463,469

(22) Filed: Aug. 9, 2006

Related U.S. Application Data (63) Continuation of application No. 09/985,683, filed on Nov. 5, 2001, now Pat. No. 7,110,360.

(51) Int. Cl.
*H04L 12/26* (2006.01)
(52) U.S. Cl. .................. 370/235; 370/252; 370/412
(58) Field of Classification Search .............. None
See application file for complete search history.

(56) References Cited

U.S. PATENT DOCUMENTS

| | | | |
|---|---|---|---|
| 5,483,526 A * | 1/1996 | Ben-Nun et al. | 370/395.7 |
| 5,493,569 A * | 2/1996 | Buchholz et al. | 370/442 |
| 6,347,337 B1 * | 2/2002 | Shah et al. | 709/224 |
| 6,477,169 B1 * | 11/2002 | Angle et al. | 370/395.42 |
| 6,487,213 B1 * | 11/2002 | Chao | 370/418 |
| 6,647,019 B1 * | 11/2003 | McKeown et al. | 370/422 |
| 6,807,594 B1 * | 10/2004 | Sindhu et al. | 710/240 |
| 6,876,663 B2 * | 4/2005 | Johnson et al. | 370/416 |
| 7,110,360 B1 * | 9/2006 | Hui et al. | 370/235 |
| 2002/0176431 A1 * | 11/2002 | Golla et al. | 370/412 |
| 2003/0026267 A1 * | 2/2003 | Oberman et al. | 370/397 |

OTHER PUBLICATIONS

Oberman, Virtual Channels in a Network Switch, Jul. 2001, U.S. Appl. No. 60/309,032, pp. 1-86 and Figs 1-30.

* cited by examiner

*Primary Examiner*—Steven H Nguyen
(74) *Attorney, Agent, or Firm*—Harrity & Harrity, LLP (57) ABSTRACT

A fabric request controller implements flow control for data cells to a network or switch fabric. The fabric request controller issues request messages to the fabric switch and receives back corresponding grant messages. The fabric request controller includes a credit counter for metering the number of allowable outstanding requests. A fake request vector component periodically issues fake requests to compensate for information loss on the switch fabric.

19 Claims, 7 Drawing Sheets

CREDIT-BASED FLOW CONTROL OVER UNRELIABLE LINKS

RELATED APPLICATIONS

This application is a Continuation of commonly assigned, co-pending U.S. patent application Ser. No. 09/985,683, filed Nov. 5, 2001, for CREDIT-BASED FLOW CONTROL OVER UNRELIABLE LINKS, the disclosure of which is hereby incorporated herein by reference.

BACKGROUND OF THE INVENTION

A. Field of the Invention

The present invention relates generally to data switching and routing, and more particularly, to data flow control over a switch fabric.

B. Description of Related Art

Routers receive data on a physical media, such as optical fiber, analyze the data to determine its destination, and output the data on a physical media in accordance with the destination. Routers were initially designed using a general purpose processor executing large software programs. As line rates and traffic volume increased, however, general purpose processors could not scale to meet these new demands. For example, as functionality was added to the software, such as accounting and policing functionality, these routers suffered performance degradation. In some instances, the routers failed to handle traffic at line rate when the new functionality was turned on.

To meet the new demands, purpose-built routers were architected. Purpose-built routers are designed and built with components optimized for routing. They not only handled higher line rates and higher network traffic volume, they also added functionality without compromising line rate performance.

A purpose-built router may include a number of input and output ports from which it transmits and receives information packets. A switching fabric may be implemented in the router to carry the packets between ports.

Flow-control refers to the metering of packet flow through the network and/or through the router. For example, it may be desirable to limit the number of packets transmitted from a particular port of the router in order to ensure that the router's switching fabric is not overloaded. One known method of implementing flow-control controls flow on a per-queue basis. One disadvantage of per-queue flow control is that it may not evenly distribute flow across all elements of the system. For example, in a system using a switch fabric, the fabric may become congested even though there is per-queue flow control.

It is therefore desirable to efficiently implement flow control without the performance degradation caused by conventional per-queue controls.

SUMMARY OF THE INVENTION

Systems and methods consistent with the invention address, among other things, a switch-fabric credit-based flow control technique that compensates for lost packets.

One aspect of the principles of the invention is directed to a network device connected to a switching fabric. The network device includes a credit counter configured to store a value indicating an amount of data eligible to be transmitted from the network device. For example, the network device may decrement the credit counter when it transmits a packet to the switching fabric. If the credit counter is decremented below a predetermined level, the port refrains from transmitting packets. The credit counter is replenished (incremented) based on, for example, a timer or an increment signal received from the switching fabric. If the signal is lost in transmission, however, the credit will be lost and the credit counter will not be replenished. Lost credits can result in under utilization of router resources leading to performance degradation. To address this issue, the network device also includes a request component and a fake request circuit. The request component generates requests to send data to the switching fabric and receives corresponding grants in response to the generated requests. The request component decrements the credit counter when the requests are generated and increments the credit counter when the corresponding grants are received. The fake request circuit generates fake requests that cause grants to be returned to the requesting component that increment and thus replenish the counter. When generating the fake requests, the credit counter is not decremented.

A second aspect of the principles of the invention is directed to a request controller for metering data flow to a network. The request controller includes a real request vector component and a fake request vector component. The real request vector component generates request messages corresponding to data units that are to be transmitted to the network and receives back grant messages indicating that the data units can be transmitted to the network. The fake request vector component periodically generates a fake request message to a destination on the network determined by a value in a pointer register. The pointer register is incremented after each of the fake request messages are generated.

A third aspect of the principles of the invention is directed to a method of metering data flow to a network. The method includes receiving at least one data unit, generating a request to transmit the data unit when a credit counter contains sufficient credits for the data unit, and decrementing the credit counter in response to generating the request to transmit the data unit.

Additionally, the method includes receiving grant messages that correspond to the transmitted requests and incrementing the credit counter in response to the grant messages. Periodically, a fake request is generated that does not correspond to a data unit. The fake request causes grant messages to be received from the network and the credit counter to be incremented in response thereto.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, credit based flow-control is implemented using a request-grant credit scheme. A credit counter is decremented whenever a request to transmit information is issued and incremented whenever a corresponding grant to transmit the information is received. Extra credits are occasionally added to the credit counter based on the average rate of corruption on the switching fabric. The extra credits are added indirectly through the generation of extra requests. In this manner, lost credits due to transmission errors can be avoided.

System Description

Figure 1:
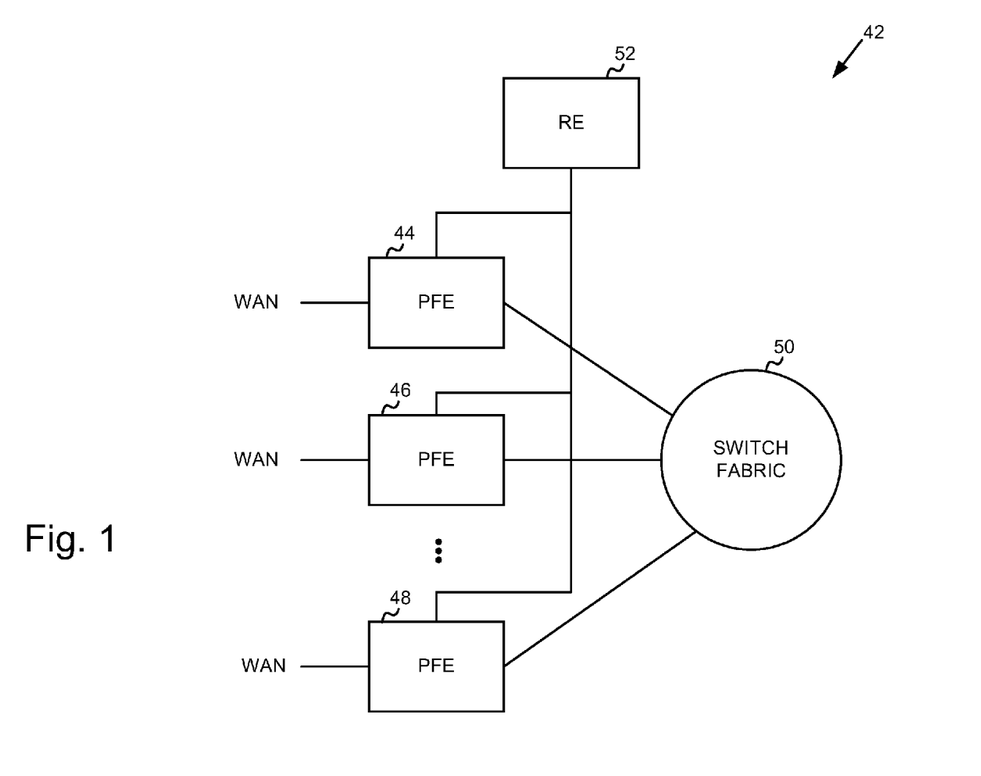
FIG. 1 is a block diagram illustrating a routing system consistent with the principles of the invention.

FIG. 1 is a block diagram illustrating a routing system 42 consistent with the principles of the invention. System 42 includes packet forwarding engines (PFEs) 44, 46 . . . , and 48, a switch fabric 50, and a routing engine (RE) 52. System 42 receives a data stream from a physical link, processes the data stream to determine destination information, and transmits the data stream out on a link in accordance with the destination information.

RE 52 performs high level management functions for system 42. For example, RE 52 communicates with other networks and systems connected to system 42 to exchange information regarding network topology. RE 52 creates routing tables based on the network topology information and forwards the routing tables to PFEs 44, 46, . . . , and 48. The PFEs use the routing tables to perform route lookup for incoming packets. RE 52 also performs other general control and monitoring functions for system 42.

PFEs 44, 46, . . . , and 48 are each connected to routing engine (RE) 52 and switch fabric 50. PFEs 44, 46 . . . , and 48 receive data on ports connecting physical links connected to a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

PFE 44 will be used to discuss the operations performed by a PFE consistent with the principles of the invention. PFE 44 processes incoming data by stripping off the data link layer. PFE 44 converts the remaining data into data structures called D cells.

For example, in one embodiment the data remaining after the data link layer is stripped off is packet data. PFE 44 stores the layer 2 (L2) and layer 3 (L3) packet header information, some control information regarding the packets, and the packet data in a series of D cells. In one embodiment, the L2, L3, and control information are stored in the first two cells of the series.

PFE 44 forms a notification based on the L2, L3, and control information and performs a route lookup using the notification and the routing table from RE 52 to determine destination information. PFE 44 may also process the notification to perform protocol-specific functions, policing, and accounting, and might even modify the notification to form a new notification.

If the determined destination indicates that the packet should be sent out on a physical link connected to PFE 44, then PFE 44 retrieves the cells for the packet, converts the new notification into header information, forms a packet using the packet data from the cells and the header information, and transmits the packet from the port associated with the physical link.

If the destination indicates that the packet should be sent to another PFE via switch fabric 50, then PFE 44 retrieves the cells for the packet, modifies the first two cells with the new notification and new control information, if any, and sends the cells to the other PFE via switch fabric 50. The receiving PFE uses the notification to form a packet using the packet data from the cells, and sends the packet out on the port associated with the appropriate physical link of the receiving PFE.

In summary, in one embodiment, RE 52, PFEs 44, 46, and 48 and switch fabric 50 perform routing based on packet-level processing. PFEs store each packet using cells while performing a route lookup using a notification, which is based on packet header information. A packet might come in from the network on one PFE and go back out to the network on the same PFE, or be sent through switch fabric 50 to be sent out to the network on a different PFE.

Figure 2:
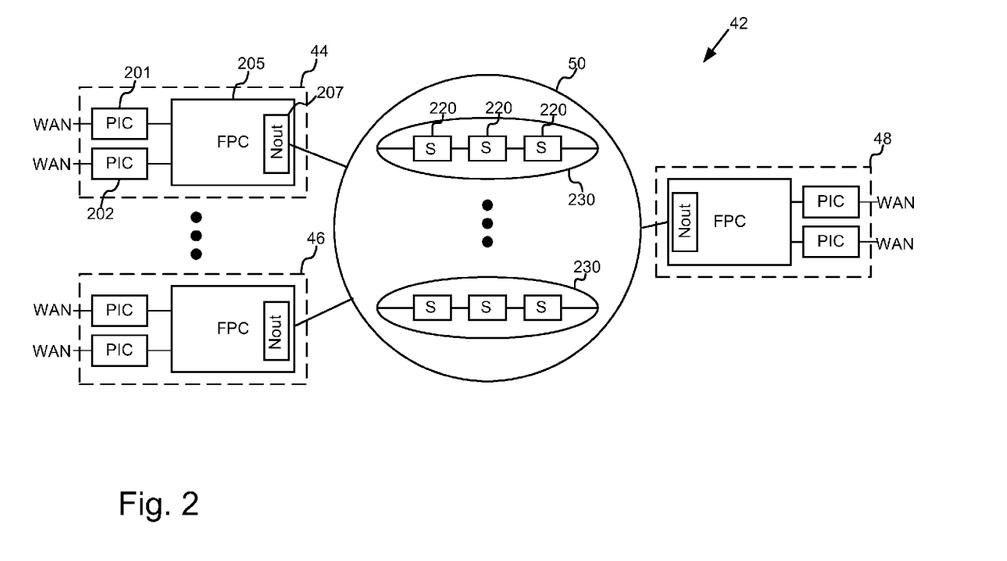
FIG. 2 is a block diagram illustrating portions of the routing system shown in FIG. 1 in additional detail.

FIG. 2 is a block diagram illustrating portions of routing system 42 in additional detail. PFEs 44, 46, and 48 connect to one another through switch fabric 50. Each of the PFEs may include one or more physical interface cards (PICs) 201-202 and flexible port concentrators (FPCs) 205.

PICs 201-202 transmit data between a WAN physical link and FPC 205. PICs are designed to handle different types of WAN physical links. For example, PIC 201 may be an interface for an optical link while PIC 202 may be an interface for an Ethernet link. Although FIG. 2 shows two PICs 201 and 202 connected to the FPCs 205, in other embodiments consistent with the invention there can be a single PIC or more than two PICs connected to an FPC 205.

Switch fabric 50 includes switches 220 that transmit cells through the fabric 50. The switches may be connected via optical links and may be organized into multiple fabric planes 230. In one embodiment, four fabric planes 230 are used.

FPCs, such as FPC 205, handles packet transfers to and from PICs 201 and 202, and switch fabric 50. For each packet it handles, FPC 205 performs the above-discussed route lookup function. FPCs 205 communicate with switch fabric 50 through a fabric communication component 207 (labeled as Nout). Communication component 207 handles the protocols associated with physically transmitting and receiving cells with switch fabric 50.

Figure 3:
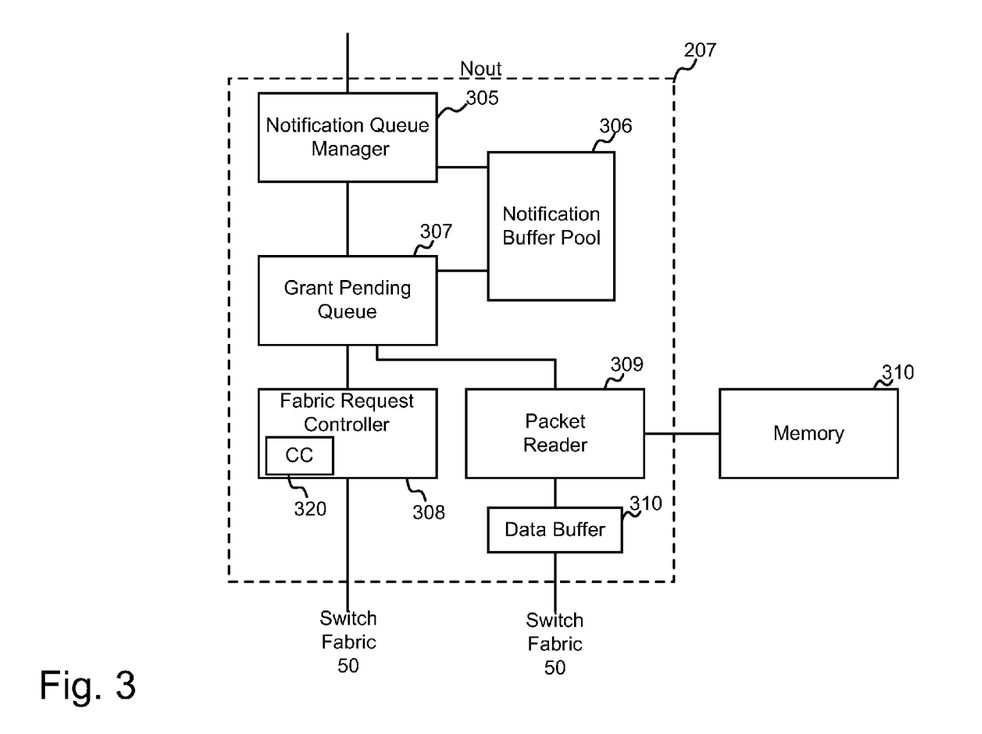
FIG. 3 is a diagram illustrating an implementation of a communication component shown in FIG. 2.

FIG. 3 is a block diagram illustrating an implementation consistent with the principles of the invention for one of communication components 207. Communication component 207 comprises a notification queue manager 305, a notification buffer pool 306, a grant pending queue 307, a fabric request controller 308, a packet reader 309, and a data buffer 310. Fabric request controller 308 additionally includes a credit-counter (cc) 320 used to implement flow-control.

Data transmission from communication component 207 begins when notification queue manager 305 receives a notification, signifying that notification and data cells are to be sent to another FPC. Upon receiving the notification, notification queue manager 305 stores the notification in notification buffer pool 306. In response, notification buffer pool 306 returns an address defining where the notification is stored in notification buffer pool 306. Notification queue manager 305 stores the received address in one or more internal queues. Notification queue manager 305 arbitrates across its internal notification address queues to select a notification for processing. Selected notifications are sent to grant pending queue 307 from notification buffer pool 306.

In order for communication component 207 to transmit the notification and its associated data cells to switch fabric 50, grant pending queue 307 firsts requests permission, via a request signal to fabric request controller 308. More particularly, grant pending queue 307, when it receives a notification, sends a request, that includes the destination and the number of cells in the packet. Grant pending queue 307 holds the outgoing notification until permission, called a grant, to send the packet data cells associated with the notification is received back from fabric request controller 308. When permission is granted, grant pending queue sends the notification to packet reader 309, which forwards the cells to data buffer 310 for transmission over the switch fabric 50.

In an embodiment consistent with the present invention, fabric request controller 308 uses credit counter 320 to implement credit-based flow control for the requests received from grant pending queue 307. The credit-based flow control is implemented in the context of an unreliable switch fabric (i.e., unreliable links). A technique for implementing credit-based flow control in the context of reliable links is disclosed in U.S. patent application Ser. No. 09/448,124, by Phillippe G Lacroute, et al., filed Nov. 24, 1999 and titled "Switching Device," the contents of which are hereby incorporated by reference.

A more detailed description of the operation of fabric request controller 308 in the context of an unreliable switch fabric will now be described with reference to FIGS. 4-7.

Operation and Implementation of Fabric Request Controller

Figure 4:
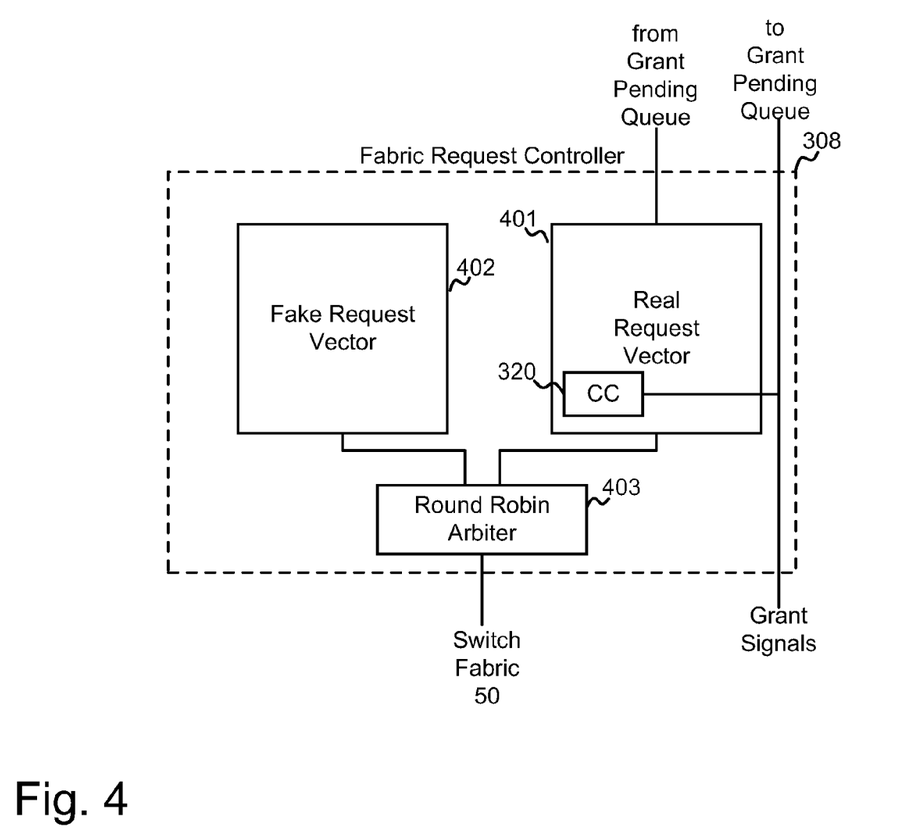
FIG. 4 is a diagram illustrating the fabric request controller shown in FIG. 3 in additional detail.

FIG. 4 is a block diagram illustrating an embodiment of fabric request controller 308 consistent with the principles of the invention. Fabric request controller 308 includes a real request vector component 401 and a fake request vector component 402. Each of components 401 and 402 generate a request vector that indicates to which of the possible destinations a request should be sent. In one implementation, switch fabric 50 may interconnect 144 devices, such as 144 FPCs. Accordingly, the request vector may be stored in a 144-bit register, with each bit corresponding to one of the possible destinations.

Arbiter 403 receives the request vectors from real request vector component 401 and fake request vector component 402, combines the two request vectors and transmits requests to each destination indicated by the combined request vectors. In one embodiment arbiter 403 is a round robin arbiter. Arbiter 403 may, for example, logical OR the two request vectors to obtain the combined request vector.

Figure 5A:
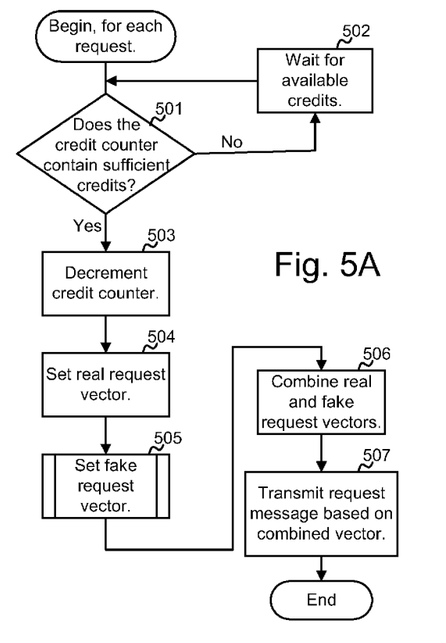
FIG. 5A is a flow chart illustrating operation of the fabric request controller in transmitting requests.
Figure 5B:
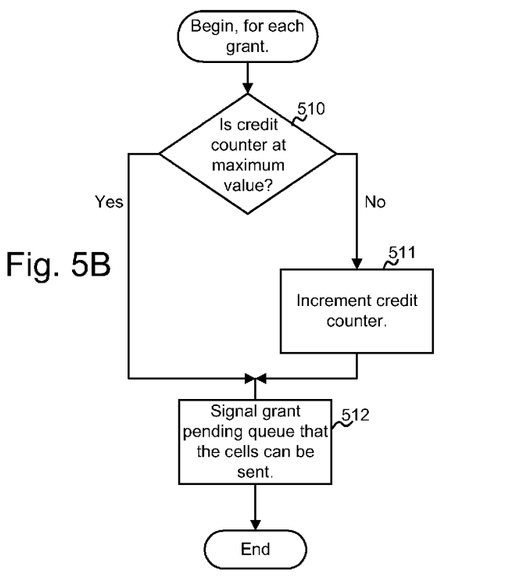
FIG. 5B is a flow chart illustrating operation of the fabric request controller in receiving grants.

FIGS. 5A and 5B are flow charts illustrating operation of fabric request controller 308 in transmitting request messages and receiving back grant messages corresponding to the requests.

FIG. 5A illustrates an exemplary method for transmitting requests. To begin, for each request received from grant pending queue 307, real request vector component 401 checks if the credit counter 320 contains sufficient credits (Act 501). If not, the request is queued until credits are available (Act 502). If credits are available, the real request vector component 401 decrements the credit counter 320 and sets the real request vector to indicate the destination(s) with which the request is associated (Acts 503 and 504). As previously mentioned, the real request vector may be a 144-bit register, where each bit corresponds to a possible destination. For example, if the data is to be sent to the destinations associated with the fifth and tenth bits in the request vector, real request vector component 401 would accordingly set the fifth and tenth bits in the real request vector to logical one.

Fake request vector component 402 similarly creates a 144-bit "fake" request vector (Act 505). Periodically, arbiter 403 reads the two request vectors and combines them into a single request vector (Act 506). Arbiter 403 transmits a request to switch fabric 50 for each destination set in the combined request vector (Act 507).

A grant message indicates that the data cells associated with a request can be sent from the FPC 205. FIG. 5B illustrates an exemplary method for receiving a grant from switch fabric 50 in response to a previously sent request. If the credit counter 320 is not saturated (i.e., it is not at its maximum value), the credit counter is incremented. (Acts 510 and 511). Fabric request controller 308 then signals grant pending queue 307 that the requested cells can be sent to switch fabric 50 via packet reader 309 and data buffer 310. (Act 512).

Figure 6:
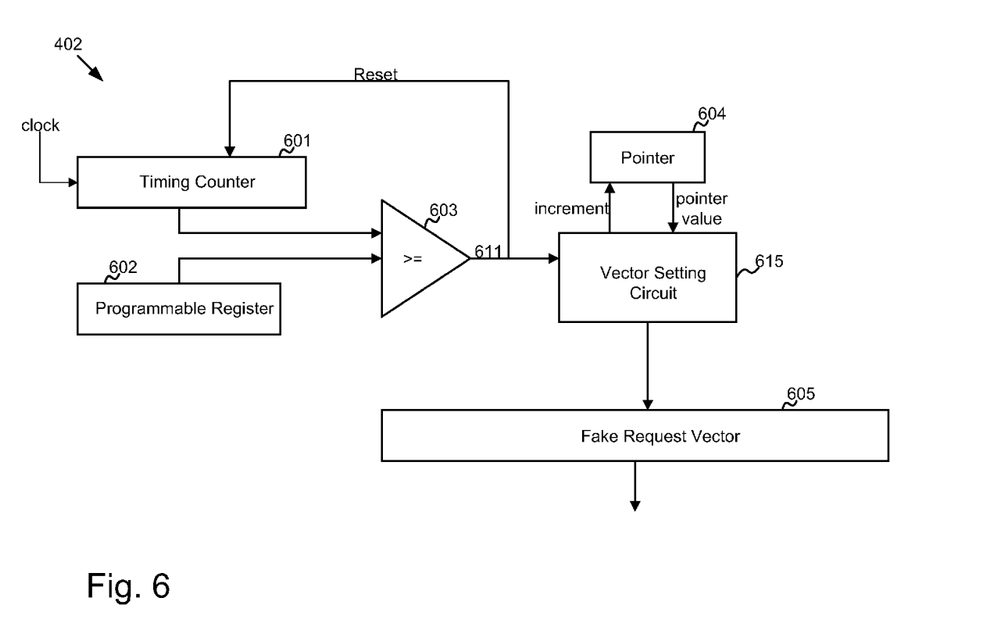
FIG. 6 is a diagram illustrating the fake request vector component shown in FIG. 4 in additional detail.

Fabric request vector component 402 generates "fake" request vectors that do not correspond to data cells in grant pending queue 307. The fake requests compensate for real requests that are periodically lost in the switch fabric 50. FIG. 6 is a diagram illustrating an embodiment of fake request vector component 402. Component 402 includes a timing counter 601, a programmable register 602, a comparator 603, a pointer 604, vector setting circuit 615, and a fake request vector 605. In one embodiment, fake request vector 605 is a 144-bit register and pointer 604 is an eight bit value that stores a reference to a location in fake request vector 605.

Timing counter 601, programmable register 602, and comparator 603 operate in conjunction with one another to generate a periodic signal that triggers the setting of fake request vector 605 by vector setting circuit 615. Counter 601 increases its count value at a rate determined by an input clock signal. Comparator 603 compares the value in counter 601 with the value in programmable register 602. When the value in counter 601 equals or exceeds the value in programmable register 602, comparator 603 generates signal 611, which resets counter 601 and activates vector setting circuit 615. In response, vector setting circuit 615 sets the bit in fake vector 605 that is referenced by pointer 604.

Figure 7:
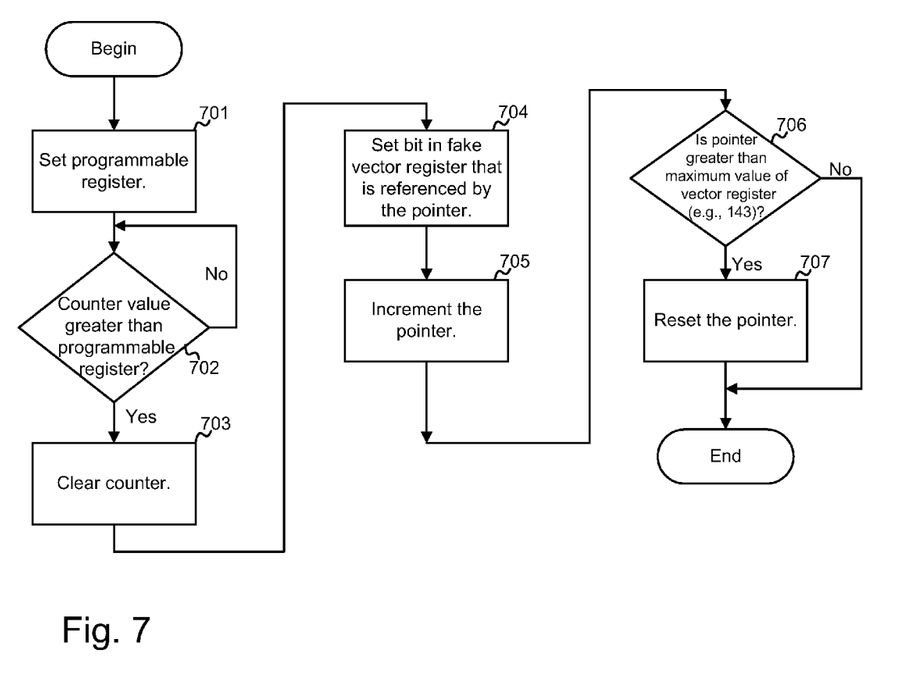
FIG. 7 is a flow chart illustrating a method of operation of the fake request vector component consistent with an embodiment of the present invention.

FIG. 7 is a flow chart illustrating a method of operation of fake request vector component 402 consistent with an embodiment of the invention. In this embodiment, counter 601 is a 24-bit counter, programmable register 602 is a 21-bit register, pointer 604 is an eight-bit register, and fake request vector 605 is a 144-bit register. These components could be substituted for components of other sizes in other embodiments.

In general, fake request vector component 402 generates fake requests at a rate that tends to compensate for real requests to switch fabric 50 that never receive back a corresponding grant signal. The rate can be determined in a variety of ways. For example, in one embodiment, the average rate of lost requests is empirically measured for the router. Lost requests may be caused by, for example, errors occurring in the optical transmission links in switch fabric 50. The credit counter 320 is not decremented when a fake request is issued, although it is incremented when a corresponding grant is received back from a destination. Real request vector component 401 does not distinguish between grants corresponding to real requests or fake requests. Accordingly, fake request vector 402 compensates for lost credits in a manner that is transparent to the circuitry in real request vector component 401 associated with the credit counter.

To begin, programmable register 602 is set to a preset value by the user (Act 701). The appropriate preset value to use may be based on an empirical observation of the error rate of the system and on the frequency of the clock driving counter 601. For example, in one embodiment, the programmable register 602 is set to a value that produces an interval of 7.4 microseconds to 500 milli-seconds. The upper 21 bits of the counter 601 is compared to the value in the programmable register 602 (Act 702). When the count value is greater than the value in the programmable register 602, the counter is cleared, via signal 611, and begins counting anew (Act 703). Additionally, vector setting circuit 615 sets the bit in fake vector register 605 at the location identified by pointer 604 and increments the pointer to point to the next position in fake vector register 605 (Acts 704 and 705). Because an eight-bit pointer can contain more than 144 values, vector setting circuit 615 also checks whether pointer 604 is greater than 143, and if so, resets the pointer to zero (Acts 706 and 707).

As described above, a fake request vector component periodically generates fake requests to a network fabric in order to compensate for real requests that are lost in the network fabric. The fake request vector component has a relatively simple hardware implementation that can generate fake requests at a high speed and programmable rate without interrupting data flow.

Although described in the context of a purpose-built router, concepts consistent with the invention can be implemented in any system that directs traffic flow based on a credit counter that is used to control data transmission resources based on a request-grant scheme.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed:

1. A network device comprising:
    a credit counter to store a value indicating an amount of data eligible to be transmitted from the network device;
    a request component to:
        generate requests to send data, and
        receive corresponding grants in response to the generated requests,
            the request component decrementing the credit counter when the requests are generated, and incrementing the credit counter when the corresponding grants are received; and
    a fake request circuit to generate fake requests to send data, the generated fake requests causing corresponding grants, in response to the generated fake requests, to be returned to the request component.

2. The network device of claim 1, further comprising:
    a grant pending queue for receiving data to be transmitted and notifying the request component of the arrival of the received data, the request component permitting the grant pending queue to transmit the received data based on the received grants.

3. The network device of claim 1, where the request component delays sending the requests when the credit counter is below a minimum value.

4. The network device of claim 3, where the request component does not increase the credit counter beyond a predetermined maximum value.

5. The network device of claim 1, where the generated fake requests do not correspond to data, in a grant pending queue, that is to be transmitted.

6. The network device of claim 1, where the fake requests are generated at a rate to compensate for grants, corresponding to the generated requests to send data, that are not received.

7. The network device of claim 1, where, when the request component receives the corresponding grants, received in response to the generated fake requests, the request component increments the credit counter.

8. A request controller for metering data flow to a network, the request controller comprising:
    a real request vector component to generate request messages corresponding to data that is to be transmitted to the network and to receive back grant messages indicating that the data can be transmitted to the network; and
    a fake request vector component to periodically generate a fake request message to a destination, on the network, determined by a value in a pointer register,
        the pointer register being incremented after each fake request message is generated.

9. The request controller of claim 8, where the network is a switching fabric.

10. The request controller of claim 8, where the fake request vector component generates the fake request messages at intervals determined by a user programmable register.

11. The request controller of claim 10, where the real request vector component generates the request messages in response to receiving requests to transmit the data.

12. The request controller of claim 8, where the real request vector component further comprises:
    a credit counter that is decremented by the real request vector component when the real request vector component generates a request message, and incremented by the real request vector component when the real request vector component receives a grant message.

13. The request controller of claim 12, where the real request vector component delays generation of request messages when the credit counter is below a predetermined value.

14. The request controller of claim 8, where the fake request vector generates the fake request messages at a rate based on a rate of loss of the network.

15. A method of metering data flow to a network comprising:
    receiving, by a network device, at least one data unit for transmission on the network;
    generating, by the network device, a request to transmit the at least one data unit when a credit counter contains sufficient credits for the transmission of the data unit;
    decrementing, by the network device, the credit counter in response to the generating the request to transmit the at least one data unit;
    receiving, by the network device, at least one grant message from the network that correspond to the transmitted requests, the at least one grant message indicating that the at least one data unit may be transmitted on the network;
    incrementing, by the network device, the credit counter in response to receiving the grant messages; and
    periodically generating, by the network device, a fake request that does not correspond to a data unit to be transmitted on the network, the fake request causing one or more grant messages to be received from the network and the credit counter to be incremented in response to receiving the one or more grant messages.

16. The method of claim 15, where the network is a switch fabric.

17. The method of claim 15, where the fake requests are generated at a rate based on a rate of data loss of the network.

18. The method of claim 15, where, when the credit counter does not contain sufficient credits for a data unit, generation of the request to transmit the data unit is delayed until the credit counter has a value above a predetermined value.

19. The method of claim 15, where the periodically generating the fake request further includes generating the fake request at predetermined times corresponding to a value stored in a user programmable register.

* * * * *